3,589,874
COMPOSITE OF COPPER BASE ALLOY ON STEEL
Sheldon H. Butt, Godfrey, Ill., assignor to
Olin Corporation
No Drawing. Filed Aug. 2, 1968, Ser. No. 749,576
Int. Cl. B32b 15/00
U.S. Cl. 29—196.3                                    19 Claims

ABSTRACT OF THE DISCLOSURE

A composite metal article comprising a copper base alloy containing iron and/or cobalt and an iron base alloy component integrally bonded together.

---

The present invention relates to composite metal articles. More particularly, the present invention resides in composite metal articles having an iron and/or cobalt containing copper base alloy and an iron base alloy integrally bonded together.

Composite articles having an iron core and a copper cladding are highly desirable commercially due to the fact that the beneficial characteristics of the core and cladding materials may be obtained in one composite article. In a single alloy frequently many properties cannot be greatly modified by alloying or thermal treatments, for example, such properties as modulus of elasticity, color, density, and strength in combination with high thermal or electrical conductivity. However, by forming composites apparent properties of the cladding can be generated while retaining the bulk properties of the core material. In this manner one can often obtain greatly modified and highly desirable properties over the single alloy.

For example, iron has the advantage of high strength at both room and elevated temperature and cold formability. By forming iron composites one can retain these desirable properties while generating properties of the cladding, such as wear resistance, color oxidation, conductivity, or tarnish resistance and fine finishing, i.e. surface quality.

Various uses to which composite articles of an iron core may be put are as follows: heat exchangers, electrical hardware such as communication equipment, builders hardware, utensils, automotive components, shipping containers and ornamental purposes.

Likewise many applications may require a core of a material of high electrical conductivity such as copper clad with a high oxidation resistant material for use, for example, as electrical terminals. Another application is that of high quality cookware, as this application generally requires a material such as a stainless steel, suitable for contact with food, clad onto a high heat conducting core of copper in order to insure uniform heat distribution.

However, in the foregoing illustrative examples, the economy of the finished integral composite article as compared to an article fabricated from solid copper is dependent on the thickness of the copper cladding or core employed, i.e. by minimizing the thickness of the copper cladding or core the economy of the article is thereby increased.

A problem of long standing and one heretofore not solved is that the thinness of the copper element is limited by the tendency of the copper to rupture during subsequent mechanical forming operations, i.e. after the core has been clad, thus exposing areas of the iron or copper core to the environment in which the composite is enployed. Naturally, rust spots may then appear, should an iron core be employed, and thereby effectively destroying the appearance of the composite article.

Accordingly, it is a principal object of the present invention to provide new and improved composite articles having an iron core and copper alloy cladding.

It is a further object of the present invention to provide new and improved composite articles having a copper base alloy core and iron base alloy cladding.

It is a still further object of the present invention to provide articles as aforesaid whereby the articles are characterized by having high strength, excellent physical properties, excellent corrosion resistance and a wide variety of uses.

Still further objects and advantages of the present invention will appear hereafter.

In accordance with the present invention, it has now been found that the foregoing objects and advantages may be readily obtained.

The present invention readily overcomes the disadvantages of the art and is a simple, convenient, and highly useful article composite comprising an iron base alloy and an iron containing copper base alloy integrally bonded together.

The process of the present invention comprises, (a) providing said iron in plate form, (b) providing said copper base alloy containing from 0.5% to 2.0% cobalt in plate form, (c) bonding together said plate materials.

Preferably, but not necessarily, the aforementioned bonding should be in accordance with the method of U.S. Pat. Nos. 3,381,364, 3,381,365 which teach convenient methods for producing composite metal articles. For example, U.S. Pat. No. 3,381,365 teaches a method for preparing an iron base alloy core composite. It is difficult to produce a composite article having an iron base core or cladding due to the formation of both adherent and flaky oxides at moderate or elevated temperatures necessary for hot rolling. This oxide layer frequently tends to break open during hot rolling but still can and often does cause severe problems. Briefly, the process described in the aforementioned U.S. Pat. No. 3,381,365 provides for heating the core, of a thickness less than 0.50 inch, to a temperature between 300 and 1350° F., rolling together said core and cladding at a speed of at least 100 ft. per minute in one pass at a reduction range between 35% to 75% with said core cladding coming together for the first time in the bite of the rolls, said cladding of a thickness less than 0.25 inch and contacting the roll prior to contacting of the core. It is necessary that the inclined angle between the core and the cladding is in excess of 5° upon entering the rolls, with the preferred angle in excess of 10°. An angle in excess of 10° will insure that the cladding and the core do not come together earlier than in the bite of the rolls.

Upon entering the rolls, the cladding and the rolls are travelling at different linear speeds whereas upon exiting from the rolls they are going at the same speed due to reduction in thickness of the composite. The difference in traveling speeds between the rolls and the cladding in combination with the pre-contacting of the cladding and the rolls generates a shear strain and introduces shearing at the bite of the rolls and the core-cladding interface. The shearing strain at this interface results in turbulent material flow thereby causing more intimate bonding by increasing interfacial linear surface of the composite by at least 20%. It is further noted that the interfacial surface between the core and cladding is characterized by the absence of interatomic diffusion between the core and cladding material.

Naturally, other methods of bonding cladding to an iron or copper base alloy core may also be employed. Thus, limitations as to thickness of the core and cladding alloy need not apply.

It is a surprising finding of the present invention that by use of a copper base alloy containing 0.5 to 5.0% iron and/or 0.5 to 2.0% cobalt the aforementioned tendency to rupture during subsequent mechanical operations is significantly decreased. Thus, bonding of iron with iron containing copper base alloys may be employed whereby the economy of the composite article is increased. By alloying iron and/or cobalt in small amounts grain growth in the copper base alloy is substantially restricted during annealing at the temperature range required to soften the iron base alloy component after having formed the composite article. By restricting grain growth the yield strength of the copper base alloy component is increased to within at least 40% of the iron base component. Thus, less thinning of the copper base alloy component occurs during subsequent mechanical forming operations wherein a change occurs in the contour of the article. In addition, the copper base alloy component does not tend to pull away or loosen from the iron base core component, or incipiently fracture, during such operations.

In accordance with the present invention any iron base alloy may be employed as the core of cladding material, i.e. any alloy containing a major proportion of iron. Typical iron base alloys which may be employed include but are not limited to the following: high purity iron, alloys of the iron-carbon family, iron-chromium family, iron-manganese family, iron-nickel family, and the iron-nickel-chromium family, etc. Typical alloying constituents include but are not limited to the following: carbon, aluminum, titanium, silicon, phosphorus, sulfur, chromium, nickel, zirconium, and zinc.

The copper alloy is a copper base alloy employed as either the core or cladding containing from 0.5 to 5.0% iron and/or 0.5 to 2.0% carbon.

Typical copper base alloys may also include but are not limited to the following alloying substituents: zinc up to 30.0%, tin up to 8.0%, aluminum up to 10.0%, manganese up to 0.08%, silicon from 0.03 to 0.20%, and nickel, calcium, titanium, chromium, tungsten and vanadium from 0.01 to 0.5%. Phosphorus may be present in an amount from about 0.015% to about 0.10% when required to deoxidize the melt before casting.

Naturally small amounts of elements may also be present in the copper base alloy as impurities, i.e., 0.2 maximum zinc, 0.03 maximum lead and total all other impurities 0.10% nominal, so long as not employed as an alloying constituent.

Naturally, the present invention also contemplates multiple cladding, i.e., sandwiching a plurality of iron base components and iron and/or cobalt bearing copper base alloy components together, with the outside cladding being either the iron and/or cobalt bearing copper base alloy component, the iron base alloy component, or a combination thereof.

In addition, the present invention is equally applicable wherein a single iron and/or cobalt bearing copper base alloy component is bonded to a single iron base alloy component.

Thus, it is seen that the present invention provides for a composite article having excellent mechanical properties, excellent corrosion resistance and pleasing in appearance.

The present invention also provides for an integral composite article comprising iron bearing copper base alloy components and iron components of increased economy. Less thinning of the copper base alloy component occurs during mechanical operations, such as deep drawing and forming, wherein a change occurs in the contour of the article, thereby permitting the use of a thinner copper base alloy component. In addition, the tendency of the various components of the composite article to pull away or loosen during such operations is substantially lessened, thereby ensuring a finished article having excellent mechanical properties.

The present invention will be more readily apparent from a consideration of the following illustrative examples.

EXAMPLE I

A copper base alloy containing from 2.1 to 2.6% iron was integrally bonded on both sides of S.A.E. 1010 carbon steel. The composite comprised a steel core approximately 0.020 in. thick, with the copper base alloy cladding approximately 0.0025 in. thick on both sides of the steel core. The composite was then annealed at a temperature of about 650° C. to effect recrystallization in the steel core and copper base alloy cladding. The resultant grain size in the copper base alloy cladding was approximately .005 mm. No incipient fracturing and very little thinning of the copper base alloy cladding was detected after subsequent deep drawing and forming.

EXAMPLE II

A copper base alloy containing from 2.1 to 2.6% iron was integrally bonded on one side of S.A.E. 1010 carbon steel and a nickel silver alloy was bonded on the other side. The resultant composite comprised a steel core approximately 0.0068 in. thick with the copper base alloy cladding on the one side approximately 0.0008 in. thick. The composite was then annealed at a temperature of about 1100° F. to effect recrystallization in the steel core, the nickel silver cladding and the iron containing copper base alloy cladding. The resultant grain size in iron containing copper base alloy cladding was approximately 0.006 mm. No recipient fracturing and very little thinning of the iron containing copper base alloy cladding was detected after subsequent deep drawing and forming.

EXAMPLE III

A copper base alloy containing from 2.1 to 2.6% iron was integrally bonded on both sides of type 409 stainless steel. The composite comprised a stainless steel core approximately 0.008 in. thick with the copper base alloy cladding approximately 0.001 in. thick on both sides of the stainless steel core. The composite was then annealed at a temperature of 1300° to 1400° F. to effect recrystallization in the stainless steel core and the copper base alloy cladding. The resultant grain size in the copper base alloy cladding was approximately 0.008 mm. No incipient fracturing and very little thinning of the copper base alloy cladding was detected after subsequent deep drawing and forming.

EXAMPLE IV

A copper base alloy containing from 2.1 to 2.6% iron was integrally bonded on one side of type 304 stainless steel. The composite comprised a stainless steel component approximately 0.020 in. thick, with the copper base alloy cladding approximately 0.005 in. thick. The composite was then annealed at a temperature of 1700 to 1800° F. to effect recrystallization in the stainless steel component and the copper base alloy cladding. The resultant grain size in the copper base alloy component was approximately 0.030 mm. No incipient fracturing and very little thinning of the copper base alloy component was detected after subsequent deep drawing and forming.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. An integral wrought composite article, comprising:
 (A) a copper base alloy component containting an alloying substituent selected from the group consisting of 0.5 to 5.0% iron, 0.5 to 2.0% cobalt and mixtures thereof, balance essentially copper,
 (B) an iron base alloy component integrally bonded to one side of said copper base alloy component, and
 (C) a nickel-silver alloy component integrally bonded to the opposing side of said iron base alloy component.

2. An integral wrought composite article comprising:
(A) a copper base alloy component containing an alloying substituent selected from the group consisting of 0.5 to 5.0% iron, 0.5 to 2.0% cobalt and mixtures thereof, balance essentially copper, and
(B) a stainless steel component integrally bonded thereto.

3. An integral composite article according to claim 2 wherein said article has a thickness less than 0.60 inch, with the interface between A and B being characterized by the absence of atomic interdiffusion, with said interface being further characterized by having at least 20% greater surface contact area than planar sheets.

4. An integral composite article according to claim 2 wherein said alloying substituent is iron.

5. An integral composite article according to claim 2 wherein said alloying substituent is cobalt.

6. An integral composite article according to claim 2 wherein said copper base alloy contains zinc in an amount up to 30%.

7. An integral composite article according to claim 2 wherein said copper base alloy contains tin in an amount up to 8.0%.

8. An integral composite article according to claim 1 wherein said alloying substituent is iron.

9. An integral composite article according to claim 1 wherein said alloying substituent is cobalt.

10. An integral composite article according to claim 1 wherein said alloying substituent is a mixture of iron and cobalt.

11. An integral composite article according to claim 1 wherein said copper base alloy contains zinc in an amount up to 30%.

12. An integral composite article according to claim 1 wherein said copper base alloy contains tin in an amount up to 8.0%.

13. An integral composite article according to claim 1 wherein said copper base alloy contains phosphorus in an amount from 0.015 to 0.10%.

14. An integral composite article according to claim 13 wherein said copper base alloy contains as impurities 0.2% maximum zinc, 0.03% maximum lead, total all other impurities 0.10% nominal.

15. An integral composite article according to claim 1 wherein said article has a thickness less than 0.60 inch, with the interface between A and B being characterized by the absence of atomic interdiffusion, with said interface being further characterized by having at least 20% greater surface contact area than planar sheets.

16. An integral composite article according to claim 1 wherein said iron base alloy is stainless steel.

17. An integral composite article according to claim 15 wherein said alloying substituent is iron.

18. An integral composite article according to claim 15 wherein said alloying substituent is cobalt.

19. An integral composite article according to claim 15 wherein said alloying substituent is a mixture of iron and cobalt.

References Cited
UNITED STATES PATENTS

| | | | |
|---|---|---|---|
| 1,904,241 | 4/1933 | Kammerer | 29—196.3 |
| 2,514,873 | 7/1950 | Keene | 29—196.3 |
| 2,654,146 | 10/1953 | Mooradian | 75—157.5 |
| 2,652,624 | 9/1953 | Guinee | 29—196.3 |
| 2,691,815 | 10/1954 | Bossenkool | 29—196.3 |
| 2,746,135 | 5/1956 | Harris | 29—196.3 |
| 2,941,289 | 6/1960 | Chace | 29—196.3 |
| 3,134,701 | 5/1964 | Evans | 29—196.3 |
| 3,139,329 | 6/1964 | Zeller | 29—196.3 |
| 3,381,365 | 5/1968 | Winter | 29—196.3 |
| 3,397,045 | 8/1968 | Winter | 29—194 |

HYLAND BIZOT, Primary Examiner

U.S. Cl. X.R.

29—199